United States Patent
Lovy et al.

(10) Patent No.: US 8,797,919 B2
(45) Date of Patent: *Aug. 5, 2014

(54) METHODS AND APPARATUSES FOR DEVICE COMMUNICATIONS

(75) Inventors: Daniel Lovy, Concord, MA (US); David M. Arfin, Palo Alto, CA (US); Elliot Lovy, San Francisco, CA (US); Edward M. Sesek, Los Altos, CA (US); Nathaniel Mark Saal, Palo Alto, CA (US); Steven J. Schwarzenbach, Livermore, CA (US); Seth Godin, Dobbs Ferry, NY (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/234,711

(22) Filed: Sep. 16, 2011

(65) Prior Publication Data
US 2012/0002571 A1 Jan. 5, 2012

Related U.S. Application Data

(63) Continuation of application No. 10/751,340, filed on Jan. 3, 2004, now Pat. No. 8,036,143.

(60) Provisional application No. 60/437,896, filed on Jan. 3, 2003.

(51) Int. Cl.
*H04L 12/28* (2006.01)

(52) U.S. Cl.
USPC ............ 370/255; 370/469; 709/218; 709/231

(58) Field of Classification Search
USPC ......... 370/255, 310, 313, 349, 401, 465–469, 370/471, 475; 709/213, 217–219, 227–228, 709/230–231; 726/2–5

See application file for complete search history.

(56) References Cited

U.S. PATENT DOCUMENTS

| | | | |
|---|---|---|---|
| 4,748,618 A | | 5/1988 | Brown et al. |
| 5,640,386 A | * | 6/1997 | Wiedeman .................... 370/466 |
| 5,852,714 A | * | 12/1998 | Tseng et al. ...................... 726/5 |
| 5,894,478 A | * | 4/1999 | Barzegar et al. .............. 370/401 |
| 6,058,115 A | * | 5/2000 | Sawyer et al. ................ 370/401 |
| 6,112,246 A | | 8/2000 | Horbal et al. |
| 6,233,611 B1 | | 5/2001 | Ludtke |

(Continued)

FOREIGN PATENT DOCUMENTS

WO WO-0023907 A1 4/2000

OTHER PUBLICATIONS

U.S. Appl. No. 10/751,340, Advisory Action mailed Sep. 24, 2010, 3 pgs.

(Continued)

*Primary Examiner* — Jeffrey M Rutkowski
(74) *Attorney, Agent, or Firm* — Schwegman Lundberg & Woessner, P.A.

(57) ABSTRACT

Apparatuses and methods to establish communications between devices. In one embodiment, a method of sharing data includes, without requiring a proxy device and without requiring a server to enable communications, receiving a request transmitted by a requesting device, authenticating the requesting device, and establishing a connection between the requesting device and a requested device. The requesting device and the requested device are dissimilar communication devices having dissimilar communications standards.

26 Claims, 4 Drawing Sheets

(56) References Cited

U.S. PATENT DOCUMENTS

| | | | |
|---|---|---|---|
| 6,298,069 | B1 | 10/2001 | Prabhu et al. |
| 6,378,000 | B1* | 4/2002 | Akatsu et al. ............... 709/245 |
| 6,725,300 | B1 | 4/2004 | Nagasaka et al. |
| 6,789,123 | B2 | 9/2004 | Li et al. |
| 6,853,637 | B1 | 2/2005 | Norrell et al. |
| 7,068,680 | B1 | 6/2006 | Kaltenmark et al. |
| 7,191,236 | B2 | 3/2007 | Simpson-Young et al. |
| 7,336,624 | B2 | 2/2008 | Hattig |
| 8,036,143 | B2 | 10/2011 | Lovy et al. |
| 2001/0030950 | A1 | 10/2001 | Chen et al. |
| 2001/0044275 | A1* | 11/2001 | Yamaguchi ............... 455/11.1 |
| 2002/0001295 | A1* | 1/2002 | Park ........................... 370/338 |
| 2002/0013818 | A1 | 1/2002 | Yamaga |
| 2002/0018478 | A1* | 2/2002 | Takeyama et al. ........... 370/401 |
| 2002/0078198 | A1 | 6/2002 | Buchbinder et al. |
| 2002/0099867 | A1 | 7/2002 | Wilkinson et al. |
| 2002/0136226 | A1* | 9/2002 | Christoffel et al. .......... 370/401 |
| 2002/0143855 | A1 | 10/2002 | Traversat et al. |
| 2002/0161895 | A1 | 10/2002 | Appiah et al. |
| 2003/0046437 | A1 | 3/2003 | Eytchison et al. |
| 2004/0213271 | A1 | 10/2004 | Lovy et al. |

OTHER PUBLICATIONS

U.S. Appl. No. 10/751,340, Advisory Action mailed Sep. 18, 2009, 3 pgs.

U.S. Appl. No. 10/751,340, Examiner Interview Summary mailed Sep. 2, 2010, 3 pgs.

U.S. Appl. No. 10/751,340, Final Office Action mailed Jun. 24, 2009, 15 pgs.

U.S. Appl. No. 10/751,340, Final Office Action mailed Jul. 8, 2010, 11 pgs.

U.S. Appl. No. 10/751,340, Final Office Action mailed Dec. 12, 2007, 15 pgs.

U.S. Appl. No. 10/751,340, Non-Final Office Action mailed Jan. 6, 2011, 13 pgs.

U.S. Appl. No. 10/751,340, Non-Final Office Action mailed Jan. 6, 2010, 11 pgs.

U.S. Appl. No. 10/751,340, Non-Final Office Action mailed Oct. 29, 2008, 15 pgs.

U.S. Appl. No. 10/751,340, Non-Final Office Action mailed Jul. 12, 2007, 19 pgs.

U.S. Appl. No. 10/751,340, Notice of Allowance mailed Jun. 10, 2011, 8 pgs.

U.S. Appl. No. 10/751,340, Response filed Mar. 20, 2009 to Non Final Office Action mailed Oct. 29, 2008, 17 pgs.

U.S. Appl. No. 10/751,340, Response filed Apr. 5, 2010 to Non Final Office Action mailed Jan. 6, 2010, 18 pgs.

U.S. Appl. No. 10/751,340, Response filed Aug. 17, 2009 to Final Office Action mailed Jun. 24, 2009, 19 pgs.

U.S. Appl. No. 10/751,340, Response filed Dec. 12, 2007 to Non Final Office Action mailed Jul. 12, 2007, 18 pgs.

U.S. Appl. No. 10/751,340, Response filed Dec. 12, 2007 to Non-Final Office Action mailed Jul. 12, 2007, 18 p.

U.S. Appl. No. 10/751,340, Response filed Apr. 6, 2011 to Non Final Office Action mailed Jan. 6, 2011, 18 pgs.

U.S. Appl. No. 10/751,340, Response filed Sep. 8, 2010 to Final Office Action mailed Jul. 8, 2010; 16 pgs.

"Jini Network Technology", Sun Microsystems, 2003 [retrieved on Dec. 30, 2003]. Retrieved from the Internet: <URL: http://www.sun.com/software/jini/ >, 2 p.

"JXTA: Find it, Get it, Use it!", Collab.Net, Inc,, and Sun Microsystems, Inc., 2003 [retrieved on Dec. 30, 2003]. Retrieved on the Internet: <URL: http://wwvv.jxta.org>, 2 p.

"Mediacode—Free your media: Frequently Asked Questions; Developer.Mediacode", 2003 [retrieved on Dec. 30, 2003]. Retrieved from the Internet: <URL: http://muse.net/faq/, http://muse.net/dev/ >, 10 p.

"pcAnywhere: Key Features", Symantec Corporation, 2003 [retrieved on Dec. 3, 2003]. Retrieved from the Internet: <URL: www.symantec.com/pcanywhere/consumer/features.html >, 1 p.

"Welcome to the UPnP Forum!; Standards", [retrieved on Dec. 30, 2003]. Retrieved from the Internet: <URL: http://www.upnp.com/ >, 2 p.

"WVC11B: Wireless-B Internet Video Camera", Linksys, A Division of Cisco Systems, Inc., 2003 [retrieved on Dec. 30, 2003]. Retrieved from the Internet: <URL: http//www.linksys.com/products/product.asp?grid=33&scid-38&prid-566 >, 4 p.

Dobrev, P,, et al., "Device and service discovery in home networks with OSGI", IEEE Communications Magazine, 40 (8), (Aug. 2002), 86-92.

Phifer, L., "GoToMyPC: Making Life Simpler for Remote and Mobile Workers", [online] White Paper, Expertcity, Inc., 2003. Retrieved from the Internet: <URL: http://www.redop.com/eng/collateral/gotomypc/productinfo/GoToMyPC_Personal_Overview.pdf >, (2003), 7 p.

Saito, T., et al., "Home Gateway Architecture and Its Implementation", IEEE Transactions on Consumer Electronics, 46, (Nov. 2000), 1161-1166.

U.S. Appl. No. 10/751,340, Examiner Interview Summary mailed Apr. 13, 2011, 3 pgs.

U.S. Appl. No. 10/751,340, Final Office Action mailed Mar. 11, 2008, 5 pgs.

* cited by examiner

METHODS AND APPARATUSES FOR DEVICE COMMUNICATIONS

RELATED APPLICATIONS

This application is a continuation of and claims the benefit of priority under 35 U.S.C. §120 to U.S. patent application Ser. No. 10/751,340, filed on Jan. 3, 2004, which claims the benefit of priority under 35 U.S.C. §119(e) to U.S. Provisional Patent Application Ser. No. 60/437,896, filed on Jan. 3, 2003, the benefit of priority of each of which is claimed hereby, and each of which are incorporated by reference herein in its entirety.

BACKGROUND

This disclosure is related to communication devices, such as, for example, Internet capable wireless devices.

Communication devices include, for example, devices capable of transmitting and/or receiving digital data. Such devices may also include devices capable of accessing the Internet, for example. Communication devices, therefore, may include, for example, personal computers, personal digital assistants (PDAs), wireless telephones, and/or wireless access points, although these are just a few examples of communication devices. One issue that arises in connection with communication devices is the sharing of data, such as digital data, amongst one or more of these devices. Techniques for establishing and/or improving the ability of these devices to share data seamlessly, for example, continue to be desirable.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

Figure 1:
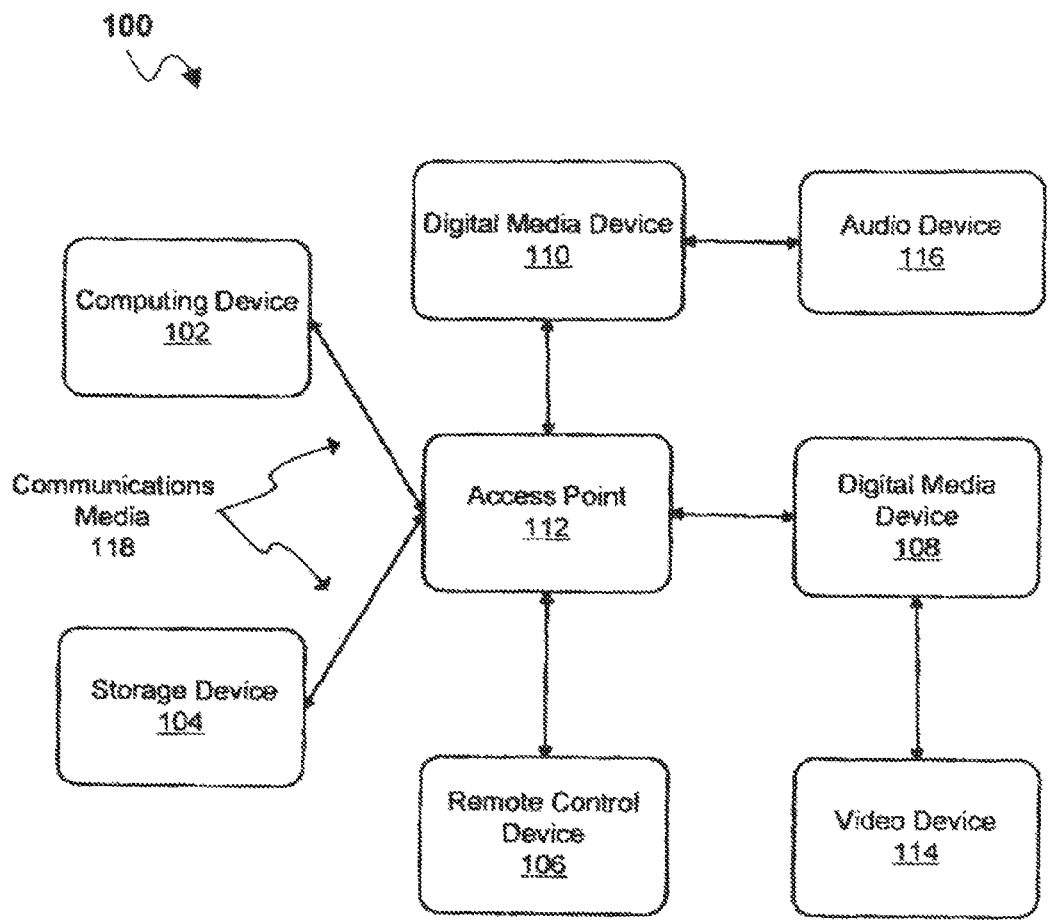
FIG. 1 is one embodiment of a Local Area Network (LAN)

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Communication devices may include devices capable of transmitting and/or receiving data, such as digital data, which may include accessing the Internet, and/or accessing a network, such as a Local Area Network (LAN), for example. Likewise, in this particular context, digital communication devices may include, for example, personal computers, personal digital assistants (PDAs), wireless telephones, wire line telephones, global positioning systems, digital media devices, such as wireless audio players and/or digital cameras, and/or wireless access points, although these are just a few examples. In this context, digital data, in particular, may include audio, video, or imaging data, for example, and may additionally be referred to as multimedia data. Communication devices, such as those just described, for example, may include the capability to send, receive, and/or execute digital data, and may further include the capability to record, store, play and/or provide data to one or more other devices, such as, for example, devices communicative coupled to a network, for example.

An issue that arises in connection with communication devices, as previously suggested, includes the ability to share or transmit data, such as digital data, between one or more devices. A user, for example, may wish to share data between one or more devices, such as, for example, by providing a digital audio file from a personal computer to a digital audio player. However, such sharing and/or transmitting of data may be difficult in environments in which the devices are not specifically designed to interoperate. In the previous example, as one illustration, it may not be possible for the personal computer and digital audio player to communicate either physically, because, for example, signals may not be transmitted and received between the devices. Likewise, it also or alternately may not be possible for the devices to communicate logically, because, for example, the devices do not operate in accordance with the same protocol, for example. Thus, typically, even if the devices were able to transmit and receive signals between them physically, these devices may nonetheless operate in accordance with different data protocols and/or signaling conventions. This may, thus, hinder interoperability and/or communication. Furthermore, conventional techniques for sharing digital data may be time consuming, and may additionally involve configuration of one or more devices and the like. For example, the audio file might be downloaded to a disk or CD and the disk or CD may then be inserted into the digital audio player; however, still, the digital audio player must have the ability to recognize the data format on the disk or CD. Thus, as this example illustrates, techniques for improving the ability of digital communication devices to share digital data continue to be desirable.

In one embodiment, and without intending to limit the scope of the claimed subject matter in any way, a first device, such as a first digital communication device, may be employed to transmit and/or receive digital data by requesting a connection to a physically separate second device, such as a second digital communication device. The physically separate device may then provide a connection, and the first device may request a particular set of data. The second device may then transmit the requested set of data, and the first device may receive it. For this data transaction to occur, however, it is desirable for the devices to have the ability to communicate logically. Again, as suggested above, typically, dissimilar communication devices, and even similar communication devices provided by different manufacturers, for example, are not designed with this ability present.

More typically, devices, such as those described, for example, may transmit and/or receive digital data by use of one or more data protocols and/or by use of one or more communications media. In this context, a communications medium may comprise any medium capable of carrying data signals, such as twisted-pair copper wires, coaxial cable, fiber optic cable, and/or radio or infrared frequencies, as just a few examples. A data protocol may comprise a set of instructions by which data signals are transmitted over a communications medium. For example, without intending to limit the scope of the claimed subject matter, a protocol may comprise a packet-based data transfer protocol, such as Transmission Control Protocol (TCP), defined by the Internet Engineering Task Force (IETF) standard 7, Request for Comments (RFC) 793, adopted September, 1981, hereinafter referred to as "TCP"; User Datagram Protocol (UDP), as defined by IETF standard 6, RFC 768, adopted in August, 1980, hereinafter referred to as "UDP"; and/or File Transfer Protocol (FTP), defined by the Internet Engineering Task Force (IETF), Request for Comments (RFC) 959, adopted October, 1985, hereinafter referred to as "FTP." Additionally, a network layer protocol may be utilized, such as Internet Protocol (IP), as defined by IETF standard 5, RFC 791, adopted in September 1981, hereinafter referred to as "IP"; however, as previously indicated, these are just examples, and the claimed subject matter is not so limited. Additionally, a communication device may be configured to operate with a digital cellular radio network, such as a Global Systems for Mobile Communications (GSM) network, and may be configured to communicate by use of one or more cellular protocols, including General Packet Radio Service (GPRS) and/or Code Division Multiple Access (COMA), as just a few examples. GSM standards are defined by the European Telecommunication Standards Institute (ETSI), and more information may be obtained on the World Wide Web. Additionally, information regarding GSM, GPRS and COMA specifications may be obtained from the 3rd Generation Partnership Project (3GPP.

Referring to FIG. 1, there is illustrated one embodiment of a Local Area Network in accordance with the claimed subject matter, here, designated network 100. Network 100 comprises a plurality of dissimilar devices. In this context, the term dissimilar devices refers to two or more devices that operate in accordance with standards, protocols or the like, such as communication standards, for example, that are not designed and/or intended to interoperate. For example, without loss of generality, examples of dissimilar devices may include: a mobile device, a residential gateway, a home entertainment device, such as a digital video recorder or personal video recorder, a personal digital assistant, home security and monitoring devices, a cell phone, a video camera, in essence, any device capable of having an IP address, or the equivalent. In this particular embodiment, some of the devices are networked together by use of access point 112, although the claimed subject matter is not limited in scope in this respect. These devices on the LAN include a computing device 102, which may comprise a personal computer, for example; a storage device 104, which may comprise a network storage device capable of storing digital data; a remote control device 106, which may have the capability to remotely control one or more devices of network 100, for example; and digital media devices 108 and 110, which may include the capability to read, store, and/or execute one or more digital data files. In this particular embodiment, coupled to digital media devices 108 and 110 respectively are an audio device 114 and a video device 116, which may include the capability to receive electronic signals, such as digital and/or analog signals, from the respective digital media devices, and may additionally include the capability to convert and/or modify these signals to audio and/or video, for example.

As may be seen from FIG. 1, devices 114 and 116 are not directly networked with other devices on the network through access point 112, but, rather, are coupled to respective networked devices 108 and 110. In this embodiment, while not all of these devices may be capable of being networked directly, in this particular embodiment, the devices are capable of a connection to a device directly coupled to the network. In this context, "connection" may refer to a logical connection, a physical connection, a functional connection, such as a communicative connection, and/or any combination thereof. In this particular context, a logical connection refers to a connection in which the particular format of a signal or other communication sent by a transmitting party, entity and/or device is capable of being comprehended by the receiving party, entity, and/or device. Typically, the particular connection will be clear from the usage in the particular context.

Continuing with this example, a system, such as network 100, may comprise a plurality of devices communicating by utilizing any number of protocols, communications media, and/or interfaces, for example. For example, although illustrated as a network coupled by access point 112, this is just one example of a particular embodiment. In an alternate embodiment, for example, one or more devices may be coupled by one or by a combination of different communications media, interfaces, and/or protocols, for example, as explained in more detail hereinafter. Likewise, a digital communication device for this particular embodiment may have the capability to access another device on the network, such as, for example, a network storage device, by anyone of a variety of mechanisms, including radio waves, infrared signals, a TCP/IP network connection, a GSM connection, and/or a Universal Serial Bus (USB) connection, for example, although, again, the claimed subject matter is not so limited. The USB specification, revision 2.0, is defined by the USB implementers forum, released April, 2000, ("USB"), available from the USB implementers 15 Forum, 5440 SOFTWARE Westgate Dr., Suite 217, Portland, Oreg. 97221. More information is available on the World Wide Web.

Continuing with this particular embodiment, such as illustrated in FIG. 1, at least some of the devices are configured to communicate by use of a common data format, and/or a common protocol. The common data format and/or common protocol, in this particular embodiment, may provide a standard interface for devices on the network to share data, and as well may provide the capability for one device to access the software and/or hardware of another device, for example. A network in accordance with the claimed subject matter, such as network 100, for example, may comprise an ad-hoc network, meaning, in this context, that a device may join or leave the network at unspecified times. Additionally and/or alternatively, a network may comprise a peer-to peer-network, meaning, in this context, that the devices on the network may include the capability to communicate directly, rather than through an interface or server, for example. Of course, the claimed subject matter is not so limited, and the network may comprise any combination of ad-hoc, peer to peer, and/or other types of networks, which may further depend, for example, on the types of devices coupled to the network. However, regardless of the network type, the communications media, communication protocols, and/or physical characteristics of the devices coupled to the network are substantially transparent, in this particular embodiment, from the viewpoint of an end-user or device accessing one or more devices on the network, as described in more detail hereinafter.

This particular interface may comprise a layered functional hierarchy, which may comprise one or more functional layers, for example, as described in more detail hereinafter. In one such embodiment, the multiple layers of a layered functional hierarchy may comprise protocol layers. Furthermore, a protocol layer of a hierarchy may perform services for one or more other protocol layers of the network hierarchy, such as higher layers, and may provide an interface between one or more other protocol layers. Thus, this mechanism allows devices to communicate through corresponding protocol layers of a common interface, for example, as described in more detail hereinafter.

A common interface, as described above for this particular embodiment, may provide the ability for devices on a network to communicate with other devices on a network and/or devices outside a network, for example, in situations in which the devices may not be designed to interoperate and/or do not employ a common platform, common protocols or interfaces, or the like. As described in more detail below, devices using a layered functional hierarchy may be capable of finding other devices on the network, communicating with other devices, and/or controlling other devices, despite the lack of commonality previously described. For this particular embodiment of a layered functional hierarchy, one or more components of one or more layers may be implemented in software, such as Java or C++, for example, although the claimed subject matter is not limited to employing Java, C++, or to any particular programming language.

Figure 2:
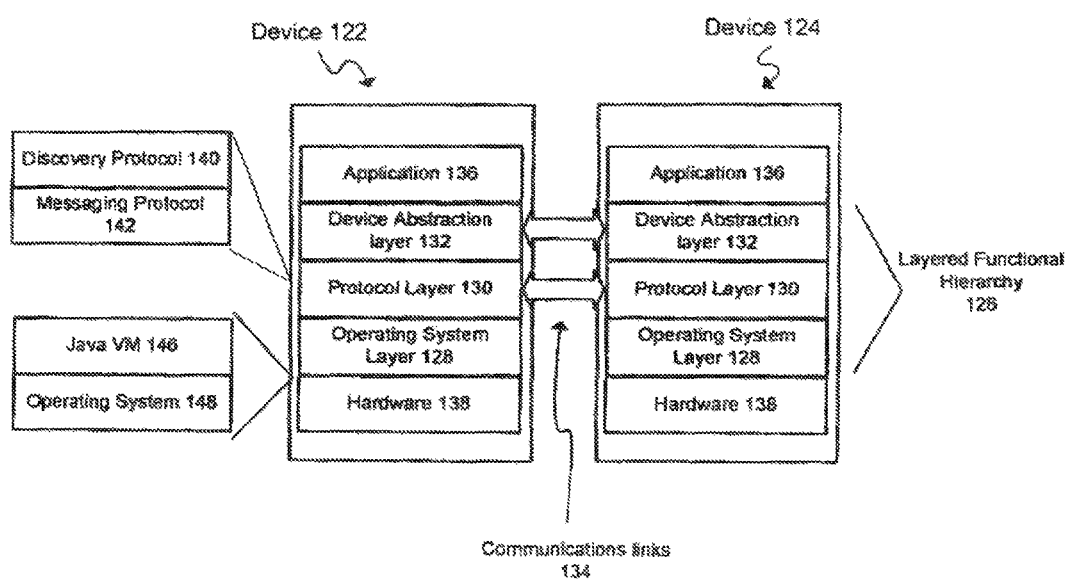
FIG. 2 is one embodiment of a network hierarchy having multiple layers.

This particular embodiment of a layered functional hierarchy may be better understood with reference to FIG. 2. FIG. 2 illustrates devices 122 and 124 which may operate in accordance with one or more layers of a layered functional hierarchy. This layered functional hierarchy, as stated previously, may provide the capability for these devices to communicate with each other and/or other devices, for example, by establishing a common interface. Layered functional hierarchy 126, in this embodiment, comprises an operating system layer 128, a protocol layer 130, and a device abstraction layer 132. For this particular embodiment, hierarchy 126 provides a communications interface between hardware 138 and application 136 of devices 122 and 124. Additionally, communications links 134 provide a mechanism by which devices 122 and 124 may mutually communicate. For example, here, communication may take place via protocol layer 130 and/or abstraction layer 132, in this embodiment. Additional details regarding the mechanisms employed in this particular embodiment for communications to take place between is explained in more detail below.

In this embodiment, hierarchy 126 comprises three layers, which may have differing functions, although it is important to note that the claimed subject matter is not limited to any particular number, arrangement and/or layer functionality. Protocol layer 130 may comprise one or more protocols, which may also include particular data formats, and may be used to perform a variety of operations. In this embodiment, and referring to device 122, protocol layer 130 comprises two protocols, discovery protocol 140 and messaging protocol 142, although other embodiments may, of course, include additional protocols and/or different protocols. While the claimed subject matter is not so limited, discovery protocol 140 includes the capability to find one or more other devices on a network, such as network 100 of FIG. 1, for example. Messaging protocol 140 includes the capability to send and/or receive data from one or more other devices on the network, and/or make requests for data to one or more devices.

Discovery protocol 140, in this embodiment, may be used by a device coupled to the network to find, or discover, one or more other devices coupled to the network. In this particular embodiment, this comprises a substantially automated process. For example, a device may perform a device discovery process by using discovery protocol 140 in a situation in which a connection to the network is initially established. Thus, in this particular example, a device, when joining a network, may initiate a discovery request as a broadcast message to any and all other devices on the network. This may be performed, for this particular embodiment, by transmitting a packet to any and all other devices on the network by use of a packet-based data transport protocol, such as UDP, as just an example. At some time after receipt of the packet, in this embodiment, a device may respond to the broadcasting device with a discovery response message. This message may comprise a packet contain information relating to the device type, its IP address, and/or other information, for example. Once the broadcasting device receives one or more discovery response messages, the device may use this information to at least partially determine a network map or network topography, which may include information such as devices on the network, device IP addresses, or the like. In one embodiment, the devices on a network may periodically verify the network map or topology. This may be performed by sending a message to one or more devices identified in the particular device's network map. This may comprise a "ping" signal or packet, for example. A device that receives a ping packet may send a response packet, and if a response packet is received by the device that sent a ping packet, the device may be able to determine that the responding device is active.

Messaging protocol 142, in this embodiment, may be used after a device has at least partially created a network map, by use of discovery protocol 140 in this particular embodiment, for example, although, of course, as previously indicated, the claimed subject matter is not limited to the protocols of this particular embodiment. Messaging protocol 142, in this embodiment, may be used to initiate requests, such as a request for data, for example. It may also be used to provide information from one device to many devices, for example.

In this particular embodiment, the messaging protocol may be used by a device to request data from another device. This protocol may be used, for example, as a request-response protocol, which, in this context, refers to a protocol based at least in part on a source/target model, on which a source device sends a request, a sub-action such as an echo from the target verifies the request, the target sends a response, and a sub-action such as an echo from the source verifies the response. In this context, the term echo refers to a return signal acknowledging that a packet arrived at its intended destination. For example, a device requesting data may send a request to another device, based at least in part on the network map created by use of discovery protocol 140. The device receiving the request may generate an echo, which may acknowledge that the request was received. The receiving device may then fulfill the request, such as by transmitting the requested data to the requesting device. The requesting device may then acknowledge fulfillment of the request by sending a sub-action, such as an echo. For example, and referring to FIG. 2, device 124 may request a file from device 122. This request may be sent as a packet by use of messaging protocol 142 of protocol layer 130. The request may be received by device 122, and device 122 may respond to the request, such as by transmitting a packet or other signal as an echo, by use of messaging protocol 142 of protocol layer 130. Device 122 may then fulfill the request of device 124, by transmitting the particular file to device 124. However, this is just one embodiment, and the claimed subject matter is not limited to this particular example of implementation of a messaging protocol.

Abstraction layer 132 provides an abstraction of logical functions of a device, or of a combination of devices. For example, a digital multimedia device may include device functions including reading and/or executing digital media files, and/or playing digital media files. Such a digital multimedia device may be capable of, for example, reading one or more files from a separate device, such as a storage device. These device functions may be abstracted into functions, such as logical functions, for controlling a device, executing data files, recording data files, and/or storing data files, as a few examples. In this context, the term abstracted with reference to a physical device refers to viewing specific selected operations divorced from the physical mechanism that results in those specific selected operations being executed or performed. For example, a digital audio player may incorporate a logical device for accessing digital files, and/or a logical device for storing, for example, to perform its functions. Thus, logical devices comprise abstractions of the functionality of a physical device. Abstraction layer 132, in this embodiment, therefore, includes an abstraction of these differing functions/logical devices, to provide for a common interface for communication between the physical devices and for performing desired tasks.

Figure 3:
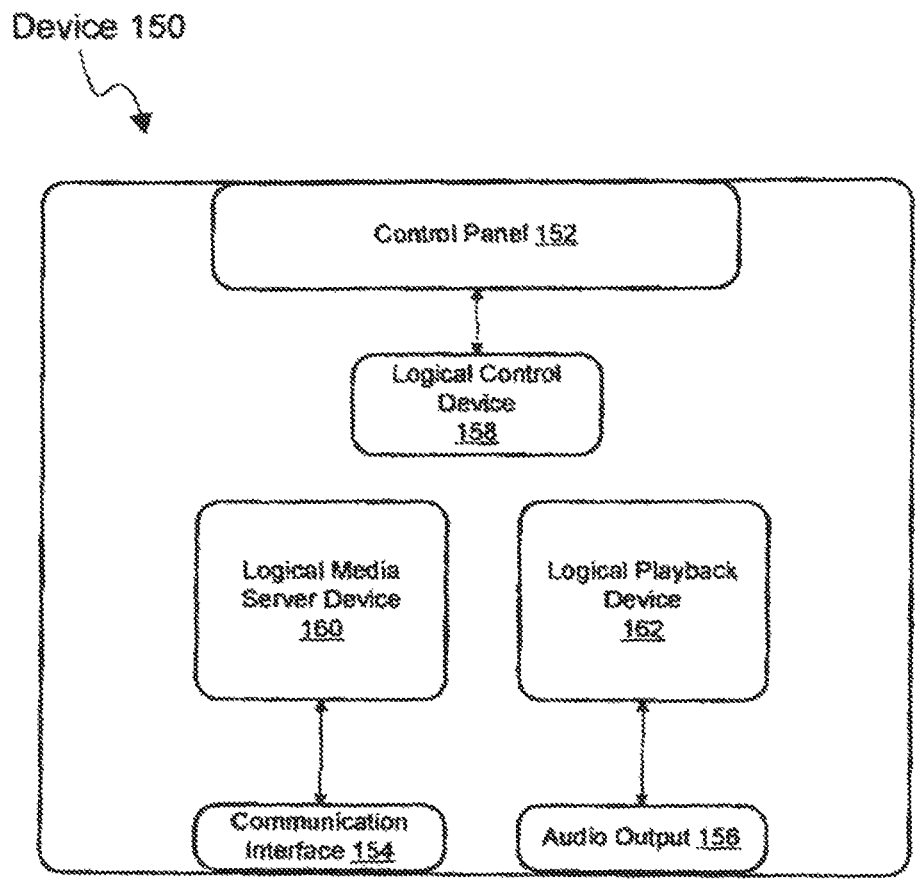
FIG. 3 is one embodiment of a physical device that may be abstracted as three logical devices.

For example, and referring to FIG. 3, there is illustrated a digital communication device 150, which may comprise a digital audio device, with one or more of the physical device functions abstracted into one or more logical device functions, as previously described. As illustrated in FIG. 3 digital communication device 150 comprises control panel 152, communication interface 154, audio output port 156, and three logical devices, logical control device 158, logical media server device 160, and logical playback device 162. As stated previously, physical device 150 may perform serving, playback, and/or controlling. However, in this particular embodiment, for convenience and ease of implementation, these functions are defined as separate logical devices, even if the same or essentially the same hardware components and/or interfaces, for example, are employed to perform more than one logical device functions. For example, device 150 may include the capability to read and/or execute a digital audio file, by providing the output signals to audio output port 156. However, logical control device 158 may initiate execution of a digital audio file by commanding logical media server device 160 to find a digital audio file in device memory (not shown). The logical media server device may locate the file, and provide a portion of the file to the logical playback device. The logical playback device may execute the file, resulting in output signals, such as analog output signals; for example, to be provided to audio output port 156. The above-described process it may turn out, for example, is executed by one integrated circuit, for example. However, these logical functions, for this particular embodiment, may be abstracted so that they appear as distinct logical devices via abstraction layer 132.

Referring to FIG. 2, operating system layer 128 of layered functional hierarchy 126 may provide access and/or an interface to one or more logical devices defined by abstraction layer 132. In this particular embodiment, operating system layer 128 thereby may provide the capability to communicate with one or more of the logical devices existing on one or more of the physical devices coupled to the network, such as network 100 of FIG. 1. Furthermore, in this particular embodiment, operating system layer 128 may at least partially utilize hardware layer 138, it may distinguish between one or more logical devices, and/or it may have a single interface to communicate with one or more logical devices that may be present in physical devices coupled to the network.

For example, in one embodiment, a network, such as network 100, may include a computing device with a storage component capable of storing digital data, such as a digital audio file. The storage component may comprise a networked storage device, for example. The network may additionally comprise a digital audio player, a stereo system coupled to the digital audio player, and/or a remote control device, which may be configured to control one or more functions of one or more components on the network, such as one or more functions of the digital audio player, for example. The network may additionally comprise a gateway, which may provide communication between devices on the network and devices not on the network, and/or other networks, for example. Abstraction layer 132 of FIG. 2 may, therefore, employ several logical devices to communicate with these physical devices.

In this particular embodiment, logical devices, such as those previously described, for example, may be categorized into function categories. For example, logical devices may include storage devices, server devices, control devices, record devices, and/or playback devices, to provide a few examples. Storage devices, in one embodiment, may include computing devices, such as file servers, and/or may additionally include other types of devices which utilize one or more types of storage, such as digital storage, including, for example, magnetic disk memory, optical disk memory, and/or one or more types of Random Access Memory (RAM) or Read Only Memory (ROM), for example. A logical storage device may include one or more memory devices or the memory functions of one or more devices, for example, again, logically abstracted into a device. Storage devices may include the capability to organize, and/or navigate a set of files, such as by creating a file directory, for example. Server devices may include the capability to provide and/or receive files, such as media files, and/or the capability to store, organize, read and/or determine characteristics of files, such as by meta-tags or by reading bit streams, for example. In one embodiment, for example, a server device may operate in conjunction with several storage devices, and/or provide an interface for accessing files stored on a plurality of storage devices.

Control devices, in this particular embodiment, may be used to operate one or more physical devices coupled to the network and/or one or more logical devices. A control device may have access to several physical devices, such as by having an abstracted control device created from a plurality of devices. For example, a control device may have a user interface or a play button as part of the user interface. The play button, as one example, may comprise an abstracted operation of two or more device functions, such as by initiating a server to provide a file to a digital audio player and/or initiating a digital audio player to play the file. A user interface, in another embodiment, may provide an interface to another device coupled to the network, such as a PDA, for example. The PDA may include controls to operate one or more of the functions of one or more other devices coupled to the network and/or may additionally include the capability to act as a networked device itself, such as by transmitting data across a network, for example.

Record and/or playback devices, in this particular embodiment, may perform functions including obtaining data, streaming data, and/or providing an interface between data and a device, such as an analog device, for example. Record and/or playback devices may include the capability to manage data transfer, such as by use of buffering and/or queuing, in order to transfer data at a desirable rate, for example. These devices may perform file transfers, for example, from a media server to a media player, and may perform these file transfers by use of one or more data protocols, such as TCP or UDP, for example.

Figure 4:
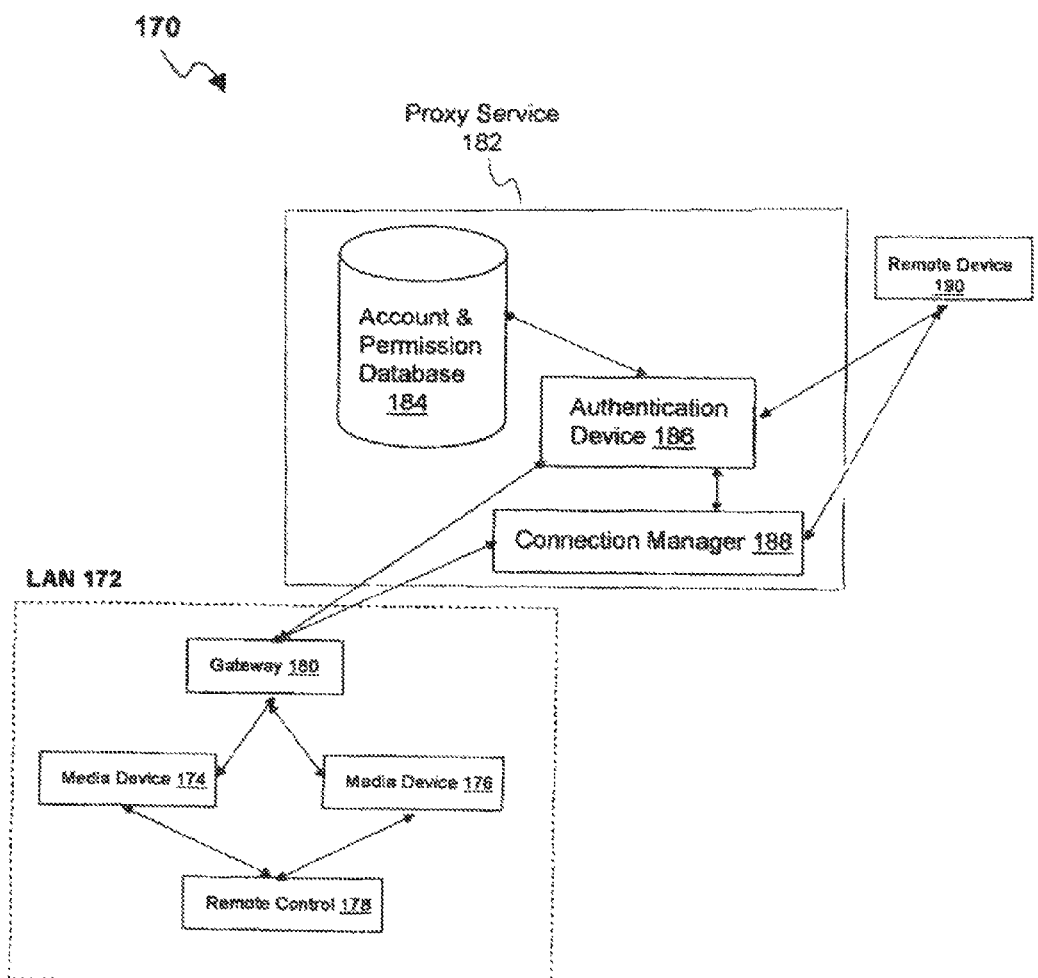
FIG. 4 is one embodiment of a LAN coupled to a remote device through a proxy service.

In another embodiment, a digital communication device, such as a wireless phone, for example, may not be networked with other devices, but may request to be coupled to one or more other digital communication devices located on a network, such as a LAN, for example. In this embodiment, the device may, for example, utilize a proxy service to manage and/or establish a connection, such as a logical connection, with one or more devices located on a LAN. Referring to FIG. 4, there is illustrated as system 170, which may employ one or more of the preceding embodiments, as well as a connection service, such as proxy service 182, for example. Proxy service 182 may comprise a plurality of functional devices, including a connection manager 188, an account and permissions database 184, and an authentication device 186, in this particular embodiment. LAN 172 may comprise a plurality of devices, such as, for example, media devices 174 and 176, remote control 178, and a gateway 180, which may comprise logical devices abstracted from one or more digital communication devices, utilizing one or more layers of layered functional hierarchy 126 of FIG. 2, for example, and may additionally be configured to provide a logical connection to proxy service 182, for example. In this embodiment, proxy service 182 may provide a logical connection to one or more remote devices, such as remote device 190, for example, which may comprise a digital communication device, and/or a logical device abstracted based at least in part on layered hierarchy 126. Proxy service 182 may provide functionality resulting in a logical connection being established between LAN 172 and remote device 190, for example, which may allow one or more devices of LAN 172 to transmit and/or receive data, such as multimedia data, from remote device 190. Particular functions and/or details regarding one or more of the devices of FIG. 4 will be explained in greater detail hereinafter.

In this embodiment, proxy service 182 is comprised of a plurality of devices, which may comprise physical and/or logical devices, for example, although it is important to note that this just one embodiment and the claimed subject matter is not so limited. For example, a physical device, such as a computing device comprising a server for example, may be configured to perform the functions of proxy service 182. Proxy service 182, in this embodiment, includes a database 184, which may contain account data and/or permission data, for example. Proxy service 182 may additionally include authentication device 186, which may be configured to authenticate a requestor, and/or verify that permission exists for a requested connection. Authentication device 186 may additionally include functionality to apply business rules, for example, such as permission levels, billing scenarios, which may be based on the features provided to a user, for example, or how many users may utilize a particular connection, as just a few examples. Proxy service 182 may additionally comprise connection manager 188. Connection manager 188 may include the capability to establish logical connections between two or more devices, such a device on LAN 172 and remote device 190, for example.

In operation, proxy service 182 may perform the following functions, although it is important to note that while these functions may be described as separate and distinct, this is just one embodiment. A device, such as a multimedia device residing on a LAN, such as LAN 172, may request a connection to a remote device, such as device 190. In this particular embodiment, as a result of a request from a device on LAN 172, gateway 180 may send a request to proxy service 182, wherein the device may request a connection with remote device 190, for example. It is noted, however, that in alternative embodiments, devices on LAN 172 may connect with remote device 190 through proxy service 182 without employing a gateway, such as gateway 180.

Proxy service 182 may receive the request, and, more specifically, in this particular embodiment, authentication device 186 may receive the request. The request may contain data relating to a particular account or user, such as an account number, and/or may additionally contain security data, such as a password, a public or private key or the like. Additionally, the request may contain data relating to the remote device, as well as data relating to the type of data requested from the remote device, for example. Authentication device 186 may use this data to authenticate a user or a device making the request. This may be performed by accessing account database 184 in this particular embodiment, for example. Account database 184 may contain account information allowing the authentication device to authenticate a requesting device, for example, and may additionally contain a set of permissions, which may determine if this particular user, for example, has permission to make the requested connection, for example. Additionally, the database may perform one or more types of "rights" management, which, in one embodiment, may comprise determining if a requesting device has the authority to perform the requested function, such as accessing a particular file, for example.

Once the requesting device is authenticated, the authentication device may provide at least a portion of the data to connection manager 188. Connection manager 188 may establish a connection to the requested device, which may be remote device 190, for example, and may establish a logical connection between the requesting device and the requested device, for example. This connection may be established by using a TCP port on the requesting device and the remote device 190, and may be configured to utilize a data protocol, such as Hypertext Transfer Protocol (HTTP), revision 1.1, defined by the World Wide Web Consortium, Request for Comments (RFC) 2616, ("HITP"), adopted June 1999, revision 1.1. More information is available on the World Wide Web. For example, TCP port 80 may be employed in one embodiment, although the climed subject matter is not limited in scope in this respect. In this particular embodiment, the request information may contain an IP address of the requesting device and an IP address of the requested device. Connection manager 188 may, therefore, in this embodiment, access a port on the respective devices, and establish a logical connection.

Regardless of whether a remote device, such as device 190, or a LAN, such as LAN 172, requests a connection, proxy service 182, for this particular embodiment, may perform authentication and/or connection services substantially in the manner previously described. The requesting device, may, for example, comprise an Internet capable wireless phone, and may request a connection to a remote LAN to provide or obtain data, such as a digital image and/or other digital data, for example, or may request a connection to a LAN in order to access the internet, for example. Additionally, a device on a LAN, such as a multimedia device, may make a request to obtain digital data, such as a digital music file, for example, from a remote device. In this particular embodiment, the request, authentication, and connection process may, therefore, be substantially as described above to perform this particular type of data transfer, although the claimed subject matter is not limited in scope in this respect.

It is further noted that in alternative embodiments LAN 172 may instead comprise a traditional Wide Area Network (WAN), a Wireless Local Area Network (WLAN), and/or another type of network. In this embodiment, however, as previously described, LAN 172 comprises a plurality of media devices, such as 174 and 176, which may include, for example, digital multimedia players, data libraries, digital data servers, and/or any number of types of digital media devices.

One or more of the media devices of LAN 172 may comprise a device capable of executing a digital audio file, such as an MP3 file, for example, and may be capable of communicating with other devices through a communications media, such as radio waves, for example. The MPEG-1 layer 3 Audio Codec (mp3), is defined by the Moving Pictures Expert Group (MPEG), under the International Standards Organisation (ISO), developed 1992, ("mp3"), available on the World Wide Web.

One or more of the media devices may comprise a digital data library, for example, that may include the capability to store, organize, identify, and/or provide digital data to one or more other devices, such as by use of one or more communications media. A digital data library may comprise one or more storage devices, for example, and these devices may be abstracted as a logical device, as described previously. A device, such as a digital data library, may additionally be capable of receiving additional data and/or organizing existing data based on one or more criteria, which may also allow the device to search and/or organize additional data, for example. Remote control 178 may comprise a device capable of controlling one or more other devices in a network, such as media devices 174 and 176, for example. Remote control 178 may include a user interface device, such as a keypad or touch screen, for example, and may allow a user to control one or more other devices on the network. In one embodiment, remote control 178 may comprise a device, such as a PDA, which may include the capability to communicate with one or more other devices of LAN 172, such as by radio waves, for example. Gateway 180 may comprise a device capable of sending a request to service proxy 182, for example, and may include the capability to connect to a remote device 190, such as by accessing the Internet, for example. One or more of these devices, such as Gateway 180, for example, may include a data viewing system, which may comprise a web browser, for example, which would allow a device to access data in an HTTP format, for example. In one embodiment, for example, Gateway 180 may comprise a personal computer (PC), although the claimed subject matter is not limited in scope in this respect.

Of course, there are a variety of ways to provide a logical connection between one or more devices, such as devices coupled to LAN 172. Devices such as these may be capable of communication by use of one or more communications media, which may comprise different media for different devices on the LAN. For example, media device 174 may communicate by use of infrared signals with remote control 178, and may communicate by use of radio waves with media device 176, for example. Additionally, it is understood that the devices may not use a common protocol for communications. For example, one device may communicate by use of the Ethernet Protocol, as defined by the Institute for Electrical and Electronics Engineers (IEEE) standard 802.3, 2000 edition ("Ethernet Specification"), available from IEEE standards, 445 Hoes Lane, P.O. Box 1331, Piscataway, N.J., 08855-1331 Additional information may be found on the World Wide Web. Conversely, another device may communicate by use of one of the 802.11 wireless protocols, as defined by the Institute for Electrical and Electronics Engineers (IEEE) standard 802.11, 1999 edition ("802.11 Specification"), available from IEEE standards, 445 Hoes Lane, P.O. Box 1331, 5 Piscataway, N.J., 08855-1331. Additional information may be found on the World Wide Web.

It is, of course, now appreciated, based at least in part on the foregoing disclosure, that software may be produced capable of performing one or more of the above-described functions. It will, of course, also be understood that, although particular embodiments have just been described, the claimed subject matter is not limited in scope to a particular embodiment or implementation. For example, one embodiment may be in hardware, such as implemented to operate on a device or combination of devices, as previously described, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method comprising:
   authenticating a requesting device; and
   without requiring a proxy device and without requiring a server to enable communications:
   receiving a request transmitted by the requesting device;
   authenticating the requesting device; and
   establishing a connection between the requesting device and a requested device, the requesting device and the requested device being dissimilar end-user communication computing devices having dissimilar communications standards and that are not designed to interoperate with others of the dissimilar end-user communication computing devices, at least one of the requesting device or the requested device having a protocol layer to allow the devices to communicate directly with one another through a common interface.

2. The method of claim 1, further comprising establishing the common interface between the requesting device and the requested device, the common interface comprising a layered functional hierarchy having multiple layers.

3. The method of claim 2, wherein at least one of the multiple layers comprises a protocol layer, the protocol layer including at least two protocols.

4. The method of claim 3, wherein the at least two protocols comprise a messaging protocol and a discovery protocol.

5. The method of claim 2, wherein at least one of the multiple layers comprises an abstraction layer including aspects of an abstracted version of the dissimilar end-user communication computing devices.

6. The method of claim 2, wherein data is to be transmitted between the dissimilar end-user communication computing devices through a layer of the layered functional hierarchy.

7. The method of claim 2, wherein at least one of the multiple layers comprises an operating system layer.

8. The method of claim 7, wherein the operating system layer includes a capability to access components of the dissimilar end-user communication computing devices.

9. The method of claim 1, wherein the dissimilar end-user communication computing devices are configured to exchange data by use of differing protocols, digital audio devices, remote control devices, wireless phones, and digital media devices.

10. The method of claim 1, wherein at least one of the dissimilar end-user communication computing devices includes a capability to control another of the dissimilar end-user communication computing devices.

11. The method of claim 1, wherein at least one of the dissimilar end-user communication computing devices includes a capability to perform at least one of the following tasks including accessing digital data, executing digital data, and transferring digital data.

12. The method of claim 1, wherein at least one of the dissimilar end-user communication computing devices includes a capability to perform at least one of the following tasks including storing digital data, transferring digital data, and organizing digital data.

13. An apparatus, comprising:
a physical device interface to receive a request from a requesting device and authenticate the requesting device; and
without requiring a proxy device and without requiring a server to enable communications:
the physical device interface further to receive a request from a requesting device and establish a connection on a network after the authentication of the requesting device, the connection comprising a communications media requested by the requesting device to a requested device, the requesting device and the requested device being dissimilar end-user communication computing devices having dissimilar communications standards and that are not designed to interoperate with others of the dissimilar end-user communication computing devices, at least one of the requesting device or the requested device having a protocol layer to allow the devices to communicate directly with one another through a common interface.

14. The apparatus of claim 13, wherein the dissimilar end-user communication computing devices are configured to form a local area network.

15. The apparatus of claim 13, wherein the common interface includes a layered functional hierarchy having multiple layers.

16. The apparatus of claim 15, wherein at least one of the multiple layers comprises a protocol layer, the protocol layer including at least two protocols.

17. The apparatus of claim 16, wherein the at least two protocols comprise a messaging protocol and a discovery protocol.

18. The apparatus of claim 15, wherein at least one of the multiple layers comprises an abstraction layer including aspects of an abstracted version of the dissimilar end-user communication computing devices.

19. The apparatus of claim 15, wherein data is capable of being shared between the dissimilar end-user communication computing devices through a layer of the layered functional hierarchy.

20. One or more tangible computer readable storage devices not comprising any transitory signals and encoded with software comprising computer executable instructions and when the software is executed operable to perform operations comprising:
authenticating a requesting device;
without requiring a proxy device and without requiring a server to enable communications:
receiving a request transmitted by the requesting device;
authenticating the requesting device; and
establishing a connection between the requesting device and a requested device, the requesting device and the requested device being dissimilar end-user communication computing devices having dissimilar communications standards and that are not designed to interoperate with others of the dissimilar end-user communication computing devices, at least one of the requesting device or the requested device having a protocol layer to allow the devices to communicate directly with one another through a common interface.

21. The one or more tangible computer readable storage devices of claim 20, further comprising:
initiating a discovery request over a network;
receiving one or more responses from the discovery request from additional dissimilar end-user communication computing devices on the network to at least partially determine a network topography; and
transmitting data between the dissimilar end-user communication computing devices.

22. The one or more tangible computer readable storage devices of claim 20, further comprising establishing the common interface between the dissimilar end-user communication computing devices, the common interface comprising a layered functional hierarchy having multiple layers.

23. The one or more tangible computer readable storage devices of claim 22, wherein at least one of the multiple layers comprises a protocol layer, the protocol layer including at least two protocols.

24. The one or more tangible computer readable storage devices of claim 23, wherein the at least two protocols comprise a messaging protocol and a discovery protocol.

25. The one or more tangible computer readable storage devices of claim 22, wherein at least one of the multiple layers comprises an abstraction layer including aspects of an abstracted version of the dissimilar end-user communication computing devices.

26. The one or more tangible computer readable storage devices of claim 22, wherein data is to be transmitted between the dissimilar end-user communication computing devices through a layer of the layered functional hierarchy.

* * * * *